Figure 1:
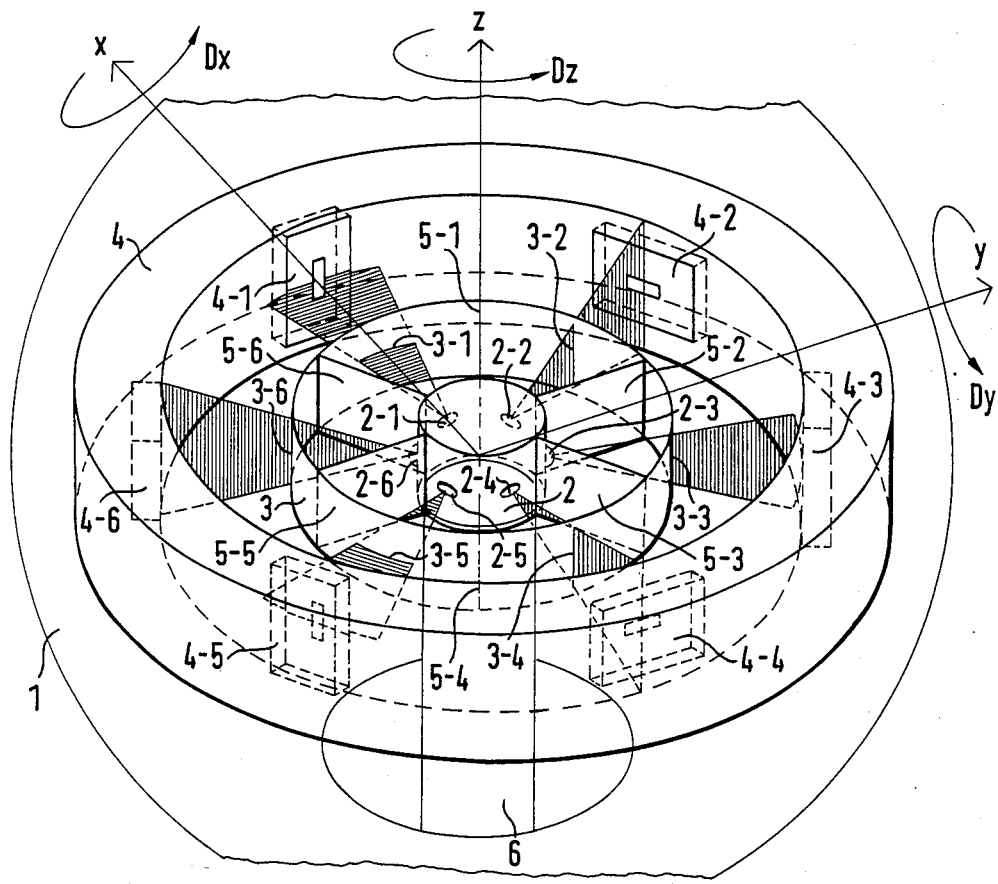

United States Patent [19]

Dietrich et al.

[11] Patent Number: 4,785,180
[45] Date of Patent: Nov. 15, 1988

[54] OPTOELECTRONIC SYSTEM HOUSED IN A PLASTIC SPHERE

[75] Inventors: Johannes Dietrich, Gilching; Georg Plank, Herrsching, both of Fed. Rep. of Germany

[73] Assignee: Deutsche Forschungs-und Versuchsanstalt fur Luft-und Raumfahrt e.V., Bonn, Fed. Rep. of Germany

[21] Appl. No.: 33,512

[22] Filed: Apr. 1, 1987

[30] Foreign Application Priority Data

Apr. 4, 1986 [DE] Fed. Rep. of Germany ....... 3611337

[51] Int. Cl.[4] .............................................. G01D 5/34
[52] U.S. Cl. .............................. 250/231 R; 73/517 R; 250/229
[58] Field of Search ............... 250/221, 229, 216, 239, 250/561, 231 R; 73/517 R, 517 P, 518, 800, 705; 340/709

[56] References Cited

U.S. PATENT DOCUMENTS 3,814,199 6/1974 Jones .................................. 250/229
3,881,106 4/1975 Pocker et al. ...................... 250/221
4,607,159 8/1986 Goodson et al. ................... 250/221

Primary Examiner—David C. Nelms
Attorney, Agent, or Firm—Collard, Roe & Galgano

[57] ABSTRACT

An optoelectronic array or system permitting the simultaneous input of six displacement components is housed in a plastic sphere wherein a fixed slit diaphragm is connected in series to each of six light-emitting devices, which are arrayed in a plane at equal angular displacements from each other. The light-emitting devices are arrayed opposite corresponding linear one-dimensional position-sensitive sensors, whose axes are aligned vertically to the direction of the slits of the corresponding slit diaphragms, so that the light-emitting devices with their corresponding slit diaphragms are adapted to move relative to the position-sensitive sensors. The individual light-emitting device allocated to each sensor is driven by an electronic controller which maintains the sum of both currents flowing in the corresponding position-sensitive sensor constant and equal for all six sub-systems and additionally regulates the radiant intensity of the light-emitting devices.

3 Claims, 2 Drawing Sheets

OPTOELECTRONIC SYSTEM HOUSED IN A PLASTIC SPHERE

The present invention relates to an optoelectronic array or system housed in a plastic sphere by means of which six displacement components can be simultaneously input. These displacements consist, in a Cartesian system of coordinates, of displacements in the X, Y and Z direction and angular rotations Dx, Dy, and Dz around these three axes.

With the use of such an array or system, the programming of robotic movements or, generally formulated, manipulator movements are quite easily, conveniently and quickly effected. In three dimensional graphics applications, on-screen projections may also be very rapidly shifted, rotated or zoomed in on.

A plastic sphere, as disclosed in DE No. 32 40 251, preferably having a diameter about the size of man's hand, is utilized for housing the optoelectronic system and a power-torque-sensing device, as disclosed in DE No. 27 27 704, is used as the measuring system.

A drawback of the power-torque-sensing device described in the above German patent is, first and foremost, the high cost associated with the manufacture of a flexible arm used in connection therewith. It is also disadvantageous in that it is necessary to apply and wire by hand a total of 16 wire strain gauges, and, furthermore, the necessary amplifier electronics connected with such wire strain gauges are expensive.

It is, therefore, an object of the present invention to provide an optoelectronic array or system which, in contrast to the power-torque sensing device heretofore known, is compact in design and can be readily manufactured and with which sweep and angular displacements, instead of forces and torques, are measured and in which the measurement values obtained are amplified and evaluated by means of simple electronic devices.

The above object is accomplished according to the present invention by means of an optoelectronic array or system housed in a plastic sphere and having at least six light-emitting devices equally displaced angularly from each other and arrayed in a surface plane, together with correspondingly aligned slit diaphragms allocated thereto. In addition, opposite each of the light-emitting devices a linear one-dimensional position-sensitive sensor is so disposed that its sensor axis is aligned vertically relative to the slit direction of the respective corresponding slit diaphragm.

In order to measure, by means of the array according to the present invention, six different components, specifically, three displacements in the direction of the X, Y and Z axis of a Cartesian system of coordinates and three angular rotations around these three axes, the light-emitting devices with their corresponding slit diaphragms are movable with respect to the position-sensitive sensors. These position-sensitive sensors are preferably arrayed on the inside of a cylindrical ring which is firmly attached to the inside of the plastic sphere. Between the ring bearing the position-sensitive sensors and the mounting device supporting at its center the light-emitting devices, provision is made for spring elements, preferably in the form of coiled springs, which are secured for example by screw bolts in such a way that the ring bearing the position-sensitive sensors may move relative to the stationary mounting device with its six light-emitting devices and associated slit diaphragms in such a way that the ring always returns to its original position.

In contrast to measuring systems previously utilized, the optoelectronic system of the present invention can be readily, economically and compactly built and assembled, thereby eliminating the essential drawbacks inherent in prior art systems.

Also, in accordance with the present invention, an individual light-emitting device is allocated to each sensor, and an electronic controller drives each light-emitting device such that the sum of both currents flowing in the allocated position-sensitive sensor is maintained at a constant rate, which, for all six sub-systems consisting of a light-emitting device, an allocated slit diaphragm and sensor, is the same. In order to achieve this, the radiant intensity of the light-emitting devices, that is for example, in the form of light-emitting diodes, the flow current are regulated accordingly. All electronic components required for the preceding described regulation, that is, for the signal shaping, filtering, digitization and subsequent conversion of the measurement values to the six Cartesian output signals, can be housed in a plastic sphere approximately 70 mm in diameter.

With less than 1% resolution, the array of the present invention exhibits very good decoupling characteristics between the six components to be measured despite its markedly simple mechanical design.

In addition, as pointed out hereinabove, the entire electronics within the sphere are integrable. Moreover, no lens systems are required with the array of the present invention, and adjustments or calibrations are similarly not required.

Other objects and features of the present invention will become apparent from the following detailed description considered in connection with the accompanying drawings. It is to be understood, however, that the drawings are designed as an illustration only and not as a definition of the limits of the invention.

Figure 2:
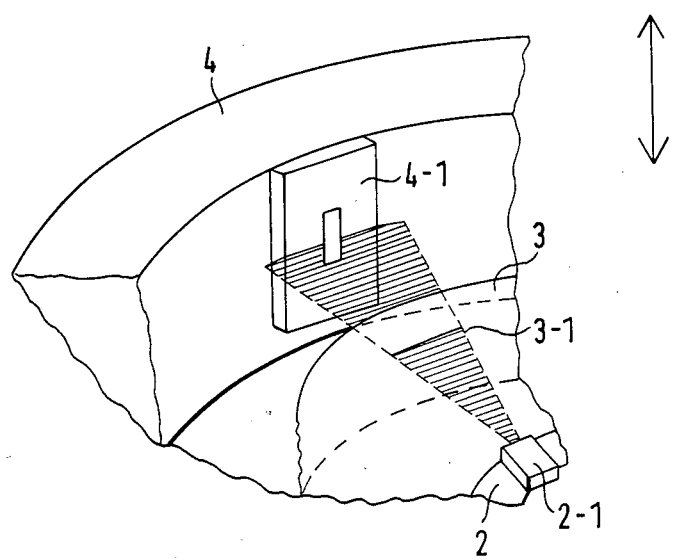

In the drawings, wherein similar reference characters denote similar elements throughout the several views:

FIG. 1 is a schematic perspective view of an optoelectronic array housed in a plastic sphere, according to the present invention; and FIG. 2 is an enlarged segment of the optoelectronic array of FIG. 1.

Now turning to the drawings, there is shown in FIG. 2 a light-emitting device, preferably in the form of a light-emitting diode 2-1, provided on a mounting device 2, which is schematically indicated. A slit diaphragm located within a cylindrical ring 3 is allocated to light-emitting diode 2-1 at a fixed, predetermined distance, shown in the section of FIG. 2 as the horizontal slit diaphragm 3-1. A position-sensitive sensor (PSD) 4-1 attached to a cylindrical ring 4 is provided in vertical position relative to the direction of the slit of the respective slit diaphragm.

The elements shown in FIG. 2 and which are arranged relative to each other as described, that is, the light-emitting diode 2-1, the slit diaphragm 3-1 and the position-sensitive sensor 4-1 arrayed vertically relative to the direction of the slit diaphragm constitute, to some extent, a base measuring system, and of which configuration, as may be seen from the perspective view shown in FIG. 1, a minimum of six are required.

In the optoelectronic array of the present invention the six light-emitting diodes 2-1 through 2-6 are preferably positioned in a surface plane, where at fixed distances thereto a slit diaphragm is allocated to each diode. Adjacent slit diaphragms in ring 3 are shown in a staggered array at angles of 90° to each other. Thus, for example, slit diaphragm 3-1 is horizontal and the two adjoining slit diaphragms 3-2 and 3-6 are vertical relative to slit diaphragm 3-1. This relation is repeated for all remaining slit diaphragms and their respective adjoining slit diaphragms.

In the embodiment shown schematically in FIG. 1, the minimum of six position-sensitive sensors 4-1 through 4-6 are correspondingly aligned on a cylindrical ring 4 relative to their respective allocated slit diaphragms 3-1 through 3-6. Additionally, ring 4 with the attached six sensors 4-1 through 4-6 is fixed to the inside of plastic sphere 1. Since the six light-emitting diodes 2-1 through 2-6 are housed in mounting device 2 fixed above support 6, and ring 4 with the six sensors located thereon opposite the fixed array of light-emitting devices 2-1 through 2-6 and the fixed slit diaphragm ring 3, is fixed to plastic sphere 1, the sensors are movable relative to the respective light-emitting devices and slit diaphragms.

Fixed mounting device 2, schematically indicated in FIG. 1 as a cylinder, can, in a practical embodiment of the invention, for example, be configured as a fixed disk connected to fixed support 6 whose outside diameter is equal more or less to the outside diameter of ring 4 which supports sensors 4-1 through 4-6 and which disk can be positioned either above or below ring 4. In this embodiment, two spring elements, preferably in the form of coiled springs, are provided between ring 4 and the discoid mounting device, which springs are secured to both the ring and the discoid mounting device. The use of such coiled springs results chiefly in the ability of ring 4 to move with plastic sphere 1 relative to the fixed array of light-emitting devices 2-1 through 2-6 and the fixed slit diaphragm ring 3 and, following each displacement or angular rotation, respectively, to return to its original position.

In the schematic perspective view of FIG. 1, radially disposed shields 5-1 through 5-6 between the respective diodes provide shielding for the individual light-emitting diodes 2-1 through 2-6. Such shields, however, may be dispensed with where the individual light-emitting diodes, as a result of their configuration or corresponding arrangement or placement on or in mounting device 2, are already so protected such that only light from the light-emitting device located radially opposite thereto strikes the respective position-sensitive sensor via the corresponding fixed slit diaphragm.

Based on the chosen, preferred overall configuration a spatially more compact measuring system has been created than would have been possible had the optical configuration been reversed, which, in principle, is equally feasible.

The minimum of six basic measuring systems shown in FIG. 2 are arrayed at equal angular displacements from each other, that is, at an angle of 60°, in a plane and have, as has already been described, alternating with this plane, horizontally and vertically aligned slit diaphragms 3-1 through 3-6. As can be seen from the position of the individual slit diaphragms and from the planes, highlighted by hatching, originating at the light-emitting diodes 2-1 through 2-6, the axes of the position-sensitive sensors 4-1 through 4-6 are always vertically aligned relative to the corresponding slit diaphragms 3-1 through 3-6. This configuration provides each basic measuring system with a selective measuring sensitivity for movement occurring in the direction of the sensor axis, while fully decoupled movements occurring both vertically to the sensor axis as a result of the slit-shaped diaphragms and vertically to the surface of the sensor are possible, in which case, however, no measurement signals are generated by such movements.

By means of the basic measuring system in a minimum sixfold array configuration in staggered position in the so-called measuring surface as shown schematically in FIG. 2, complete detection of all six possible motion components, that is, of the three displacements in the direction of the three axes of the system of coordinates and the three angular movements around these three axes, is achieved. The minimum of six position-sensitive sensors 4-1 through 4-6 are so attached to cylindrical ring 4 that the zero point of their sensor surfaces forms a common plane, the aforementioned measuring surface. Because plastic sphere 1 is firmly attached to ring 4 supporting the sensors and because ring 4 is connected with the fixed mounting device chiefly by means of spring elements, which mounting device supports the array of light-emitting devices and corresponding fixed slit diaphragms, these spring elements maintain the entire measuring system in the mechanical zero or neutral position if no commands are issued to sphere 1.

By varying the spring characteristics (their tension), broad flexibility in determining the operating characteristics of the sphere may be achieved. When relatively nonrigid spring elements are used, sphere 1 functions substantially as a displacement-sensitive sensor, while with the use of stronger spring elements, commands are issued more through exerting forces and torques.

Where not just one light source is used for all sensor systems but, rather, where each so-called basic measuring system has, respectively, its own allocated light source, the necessary signal shaping electronics can be achieved very easily. The pertinent position of the light aperture allocated to the respective position-sensitive sensor can be determined from its two output currents (I1, I2) which, prior thereto, are converted to proportional voltages, based on the known relationship $(U1-U2)/(U1+U2)$. Differential-mathematical computation of this ratio, however, can only be achieved with comparatively great effort. Detection and digitization of voltages U1 and U2 and the subsequent digital determination of the expression imply additional quantization errors in the result, especially where low-cost transformers having low resolution capability are used.

As has already been mentioned, the optoelectronic array of the present invention has resolved this problem in that a separate light source has been allocated to each linear one-dimensional position-sensitive sensor, which light source is driven by a simple electronic controller. With this electronic controller the sum of both sensor currents I1 and I2 is measured, and the radiant intensity of the allocated light source is controlled such that, independent of the distance and position of the allocated slit diaphragm (3-1 through 3-6), this sum always equals a fixed adjusted value, which value is identical for all of the basic measuring systems.

With the aid of this electronic controller, for example, different sensor sensitivities, varying luminous diode-efficiency factors, electronic component tolerances and temperature drift are automatically, rapidly stabilized. Thus, further alignment is not needed and can therefore be dispensed with. The desired position signal UL can be very accurately and simply determined merely by the difference $(U1-U2)$ of both voltages U1 and U2 which are proportional to the sensors' output currents I1 and I2.

The six position voltages UL1 through UL6 of individual position-sensitive sensors 4-1 through 4-6 thus determined are digitized and fed to a microcomputer 5 which, for example, then computes, using the simple system of equations which follows, the total of six displacements and angular rotations:

$$\begin{bmatrix} X \\ Y \\ Z \\ Dx \\ Dy \\ Dz \end{bmatrix} = \begin{bmatrix} 0 & 1.75 & 0 & 0 & 0 & -1.75 \\ 0 & -1 & 0 & 2 & 0 & -1 \\ 1 & 0 & 1 & 0 & 1 & 0 \\ 0 & 0 & 1.75 & 0 & -1.75 & 0 \\ 2 & 0 & -1 & 0 & -1 & 0 \\ 0 & 1 & 0 & 1 & 0 & 1 \end{bmatrix} \cdot \begin{bmatrix} UL1 \\ UL2 \\ UL3 \\ UL4 \\ UL5 \\ UL6 \end{bmatrix}$$

Based on testing conducted with a prototype of the optoelectronic array or system according to the present invention, the measuring array installed in a plastic sphere was shown to function perfectly. For example, a robot having six degrees of freedom and completely decoupled in his movements, was maneuvered about on straight paths in space. Orientation of the robot's hand could also be controlled without incurring translational movements.

The optoelectronic array of the invention is also excellently suited for high precision positioning tasks required, for example, of robots and machine tools. In such case, the array of light-emitting devices (together with the corresponding diaphragm element) and the ring with the position-sensitive sensors are not connected by springs but are placed separately on the two machine parts to be aligned. With the aid of the optoelectronic array of the invention and the post-wired electronic controller, the parts can be aligned in all six degrees of freedom or subsisting errors in alignment can be very accurately determined.

Without altering the basic premise of the optoelectronic array of the invention, large coverage sensors can be used to encompass thereby larger areas of displacement and angle measurement. In this case, use of lens systems to achieve beam convergence or beam imaging on a sensor surface may then be meaningful.

While only a single embodiment of the present invention has been shown and described, it will be obvious that many changes and modifications may be made thereunto without departing from the spirit and scope of the invention.

What is claimed is:

1. An optoelectronic system housed in a plastic sphere allowing for the simultaneous input of six displacement components, consisting of three displacements and three angular rotations in or around the three axes of a Cartesian system of coordinates, the optoelectronic system comprising:
   at least six light-emitting devices arranged in a plane at equal angular displacements from each other;
   a fixed slit diaphragm arranged in series with each of said at least six light-emitting devices;
   a position-sensitive sensor having two output currents is arranged in series with each of said at least six light-emitting devices and corresponding slit diaphragms, the axis of each position-sensitive sensor being aligned orthogonally to the direction of the slit of the corresponding slit diaphragm, said light emitting devices with their corresponding slit diaphragms being adapted to move with respect to the position-sensitive sensors; and
   an electronic controller for driving the individual light-emitting devices is allocated to each sensor so as to ensure the sum of the two outpt currents flowing out of the respective position-sensitive sensor to a constant and equal valve for all six systems and to also regulate the radiant intensity of the light-emitting devices.

2. The optoelectronic system in accordance with claim 1, which further comprises a cylindrical ring firmly attached to the inside of said plastic sphere, said position-sensitive sensors being suitably aligned and arrayed on the inside of said cylindrical ring, and spring elements disposed between said ring and a mounting device supporting the light-emitting devices in its center, so that said ring is adapted to move relative to the stationary array of said at least six light-emitting devices and respective corresponding fixed slit diaphragms in such a manner that the ring always returns to its unbiased position.

3. The optoelectronic system in accordance with claim 2, wherein said at least six light-emitting devices are housed in a mounting device to which a cylindrical slit-ring is connected by radially arranged shields, said slit diaphragms being arrayed on said slit-ring at 90° angles to each other at the same angular displacements as the light-emitting devices disposed on the mounting device, said slit diaphragms being alternately arrayed opposite the corresponding light-emitting devices in a radial direction.

* * * * *